United States Patent
Malladi et al.

(10) Patent No.: US 8,503,485 B2
(45) Date of Patent: Aug. 6, 2013

(54) METHOD AND APPARATUS FOR PROCESSING PRIMARY AND SECONDARY SYNCHRONIZATION SIGNALS FOR WIRELESS COMMUNICATION

(75) Inventors: Durga Prasad Malladi, San Diego, CA (US); Byoung-Hoon Kim, Seoul (KR); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 12/439,714

(22) PCT Filed: Oct. 1, 2007

(86) PCT No.: PCT/US2007/080120
§ 371 (c)(1),
(2), (4) Date: Jun. 10, 2009

(87) PCT Pub. No.: WO2008/042874
PCT Pub. Date: Apr. 10, 2008

(65) Prior Publication Data
US 2010/0182979 A1    Jul. 22, 2010

Related U.S. Application Data

(60) Provisional application No. 60/828,055, filed on Oct. 3, 2006.

(51) Int. Cl.
*H04J 3/06* (2006.01)
(52) U.S. Cl.
USPC ........... 370/503; 370/350; 375/343; 375/149; 375/152
(58) Field of Classification Search
USPC ................. 370/350, 503, 342, 343, 344, 347, 370/498, 493; 375/343, 149, 152
See application file for complete search history.

(56) References Cited

U.S. PATENT DOCUMENTS 6,185,440 B1   2/2001   Barratt et al.
6,526,091 B1 *  2/2003   Nystrom et al. ............... 375/142
(Continued)

FOREIGN PATENT DOCUMENTS

EP   0772329   5/1997
RU   2233033   7/2004
(Continued)

OTHER PUBLICATIONS

Partial International Search Report—PCT/US07/080120, International Search Authority—European Patent Office—May 2, 2008.
(Continued)

*Primary Examiner* — Dady Chery
(74) *Attorney, Agent, or Firm* — Ashish L. Patel

(57) ABSTRACT

Techniques for facilitating cell search by user equipments (UEs) in a wireless communication system are described. In an aspect, a primary synchronization code (PSC) sequence may be generated based on a Frank sequence and a constant amplitude sequence that is repeated multiple times. In another aspect, a set of PSC sequences may be generated based on complementary sequences having good aperiodic correlation properties and efficient implementations. In one design, PSC sequences A+B and B+A may be formed based on Golay complementary sequences A and B, there "+" denotes concatenation. In yet another aspect, a set of secondary synchronization code (SSC) sequences may be generated based on a set of base sequences and different modulation symbols of a modulation scheme. Each base sequence may be modulated by each of M possible modulation symbols for the modulation scheme to obtain M different SSC sequences.

14 Claims, 11 Drawing Sheets

(56) References Cited

U.S. PATENT DOCUMENTS

| | | | |
|---|---|---|---|
| 6,567,482 B1 * | 5/2003 | Popovic' | 375/343 |
| 6,717,930 B1 * | 4/2004 | Sezgin et al. | 370/335 |
| 7,065,064 B2 * | 6/2006 | Chitrapu | 370/335 |
| 2001/0021199 A1 * | 9/2001 | Lee et al. | 370/503 |
| 2003/0128787 A1 * | 7/2003 | Terasawa et al. | 375/367 |
| 2005/0084035 A1 | 4/2005 | Kim et al. | |
| 2006/0050799 A1 * | 3/2006 | Hou et al. | 375/260 |
| 2007/0133390 A1 * | 6/2007 | Luo et al. | 370/208 |

FOREIGN PATENT DOCUMENTS

| | | |
|---|---|---|
| RU | 2253127 | 5/2005 |
| WO | WO0035117 | 6/2000 |
| WO | WO0058748 A1 | 10/2000 |
| WO | 0076080 | 12/2000 |

OTHER PUBLICATIONS

Popovic B M: "Efficient matched filter for the generalized chirp-like polyphase sequences" IEEE Transactions on Aerospace and Electronic Systems USA, vol. 30, No. 3, Jul. 1994, pp. 769-777, XP002476875.

QUALCOMM Europe: "Link analysis of initial cell search" 3GPP TSG-RAN WG1 #46BIS, (Online) vol. r1-062691, Oct. 19, 2006,—Oct. 13, 2006 pp. 1-13, XP002476876.

QUALCOMM Europe: "SCH structure for E-UTRA" 3GPP TSG-RAN WG1 #46, (Online) vol. r1-062037, Aug. 28-Sep. 1, 2006 pp. 1-5, XP002476874.

QUALCOMM Europe: "SCH design considerations for WCDMA (LCR) based E-UTRA downlink," 3GPP TSG-RAN WG1 #43, No. r1-051495, Nov. 7-11, 2005, pp. 1/9-9/9.

International Search Report—PCT/US07/080120, International Search Authority—European Patent Office—Sep. 25, 2008.

Written Opinion—PCT/US07/080120, International Search Authority—European Patent Office—Sep. 25, 2008.

Taiwan Search Report—TW096137093—TIPO—Sep. 22, 2011.

European Search Report—EP12150948—Search Authority—Munich—Mar. 19, 2012.

* cited by examiner

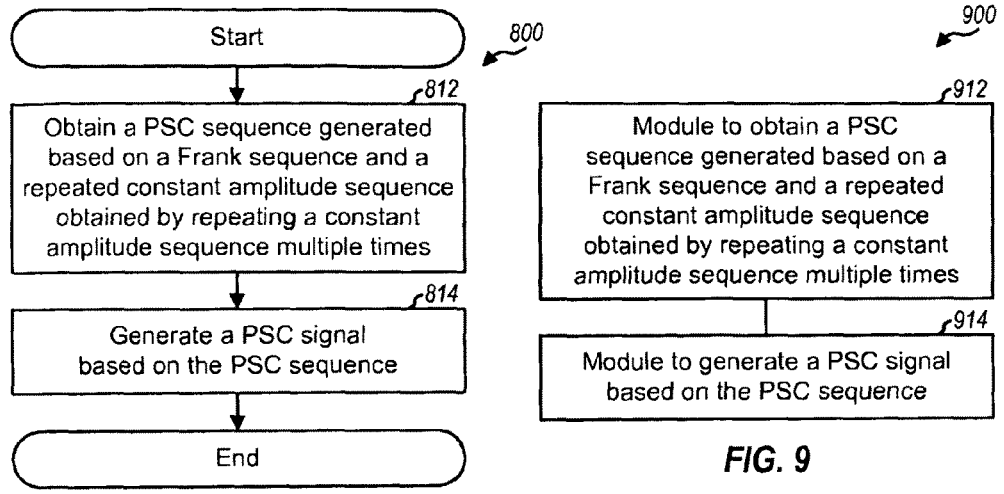
FIG. 8
FIG. 9
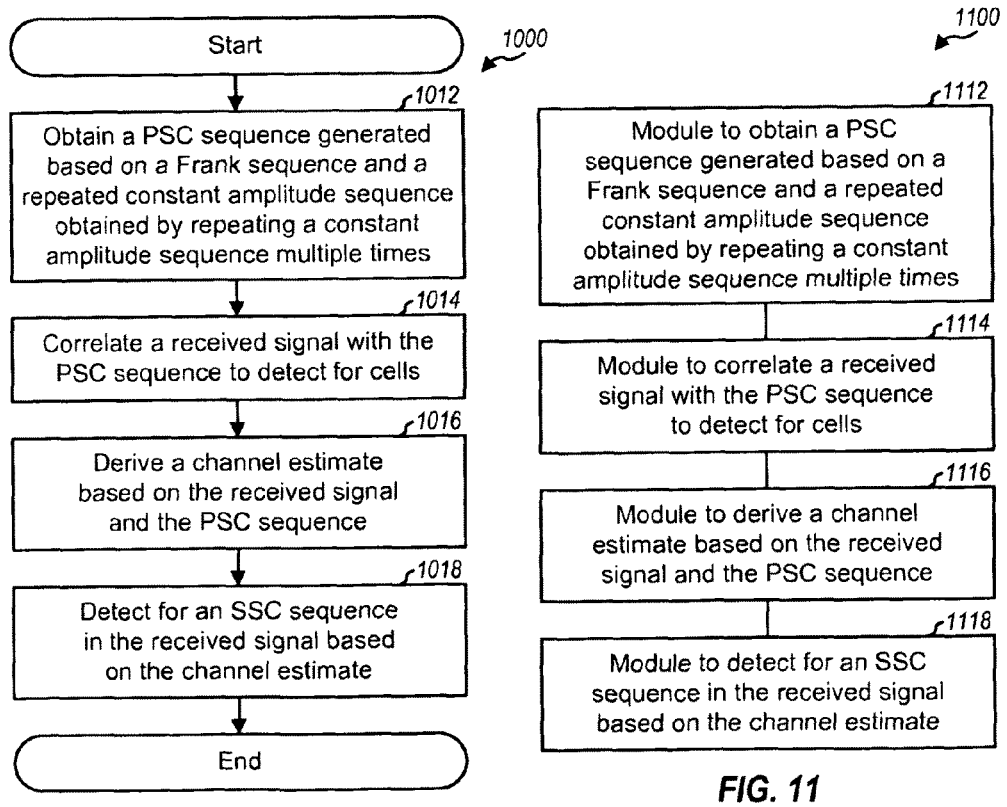
FIG. 10
FIG. 11

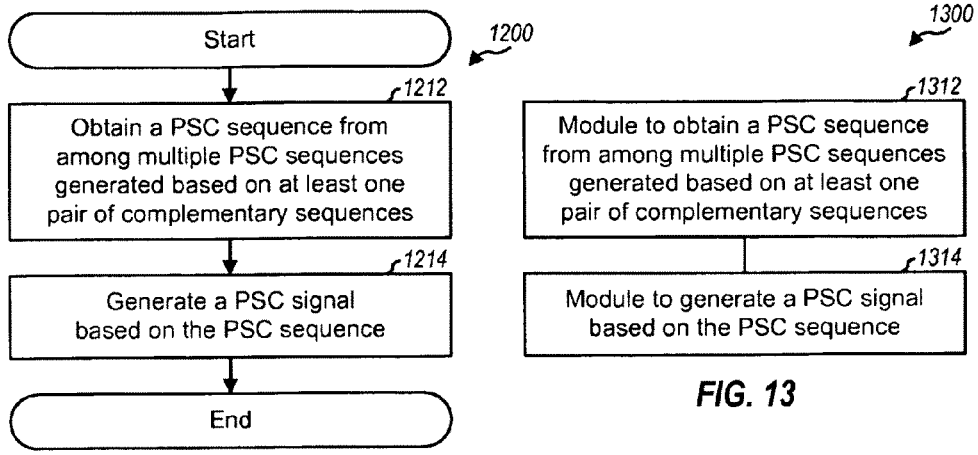
FIG. 12
FIG. 13
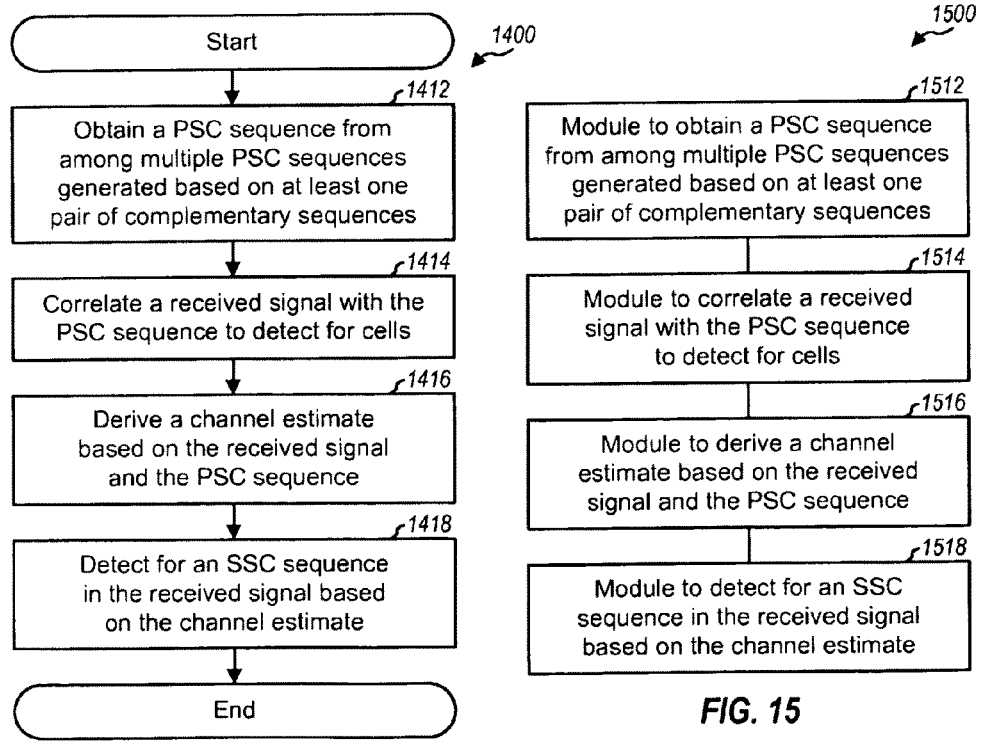
FIG. 14
FIG. 15

METHOD AND APPARATUS FOR PROCESSING PRIMARY AND SECONDARY SYNCHRONIZATION SIGNALS FOR WIRELESS COMMUNICATION

The present application claims priority to provisional U.S. Application Ser. No. 60/828,055, entitled "A METHOD AND APPARATUS FOR P-SCH AND S-SCH SEQUENCES FOR E-UTRA," filed Oct. 3, 2006, assigned to the assignee hereof and incorporated herein by reference.

BACKGROUND

I. Field

The present disclosure relates generally to communication, and more specifically to synchronization techniques for wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). A UE (e.g., a cellular phone) may be within the coverage of zero, one, or multiple base stations at any given moment. The UE may have just been powered on or may have lost coverage and thus may not know which base stations can be received. The UE may perform cell search to detect for base stations and to acquire timing and other information for the detected base stations.

Each base station may transmit synchronization signals to assist the UEs perform cell search. In general, a synchronization signal may be any signal that allows a receiver to detect for a transmitter and to obtain timing and/or other information. The synchronization signals represent overhead and should be transmitted as efficiently as possible. Furthermore, the synchronization signals should allow the UEs to perform cell search as quickly and efficiently as possible.

SUMMARY

Techniques for facilitating cell search by UEs in a wireless communication system are described herein. In an aspect, a primary synchronization code (PSC) sequence may be generated based on a Frank sequence and a constant amplitude sequence that is repeated multiple times. The Frank sequence can provide good frequency offset and channel estimation performance. The constant amplitude sequence can provide good partial correlation performance. The constant amplitude sequence may be based on a Golay sequence, an M-sequence, a pseudo-random number (PN) sequence, etc. In one design, a repeated constant amplitude sequence of length $N^2$ may be obtained by repeating N times the constant amplitude sequence of length N. The PSC sequence of length $N^2$ may be generated based on the Frank sequence of length $N^2$ and the repeated constant amplitude sequence of length $N^2$.

In another aspect, a set of PSC sequences may be generated based on complementary sequences having good aperiodic correlation properties and efficient implementations. In one design, PSC sequences A+B and B+A may be formed based on Golay complementary sequences A and B, there "+" denotes concatenation. Detection of PSC sequences A+B and B+A may be efficiently performed with much fewer arithmetic operations than other types of PSC sequences.

In yet another aspect, a set of secondary synchronization code (SSC) sequences may be generated based on a set of base sequences and different modulation symbols of a modulation scheme. The base sequences may be CAZAC (constant amplitude zero auto correlation) sequences, PN sequences, complementary sequences, etc. Each base sequence may be modulated by each of M possible modulation symbols for the modulation scheme to obtain M different SSC sequences. A UE may derive a channel estimate based on a detected PSC and may perform coherent detection with the channel estimate to determine a modulation symbol sent in a base sequence.

Various aspects and features of the disclosure are described in further detail below.

BRIEF DESCRIPTION OF THE DRAWINGS

FIGS. 8 through 19 show processes and apparatuses for generating PSC and SSC signals by the Node B and for detecting for PSC and SSC signals by the UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
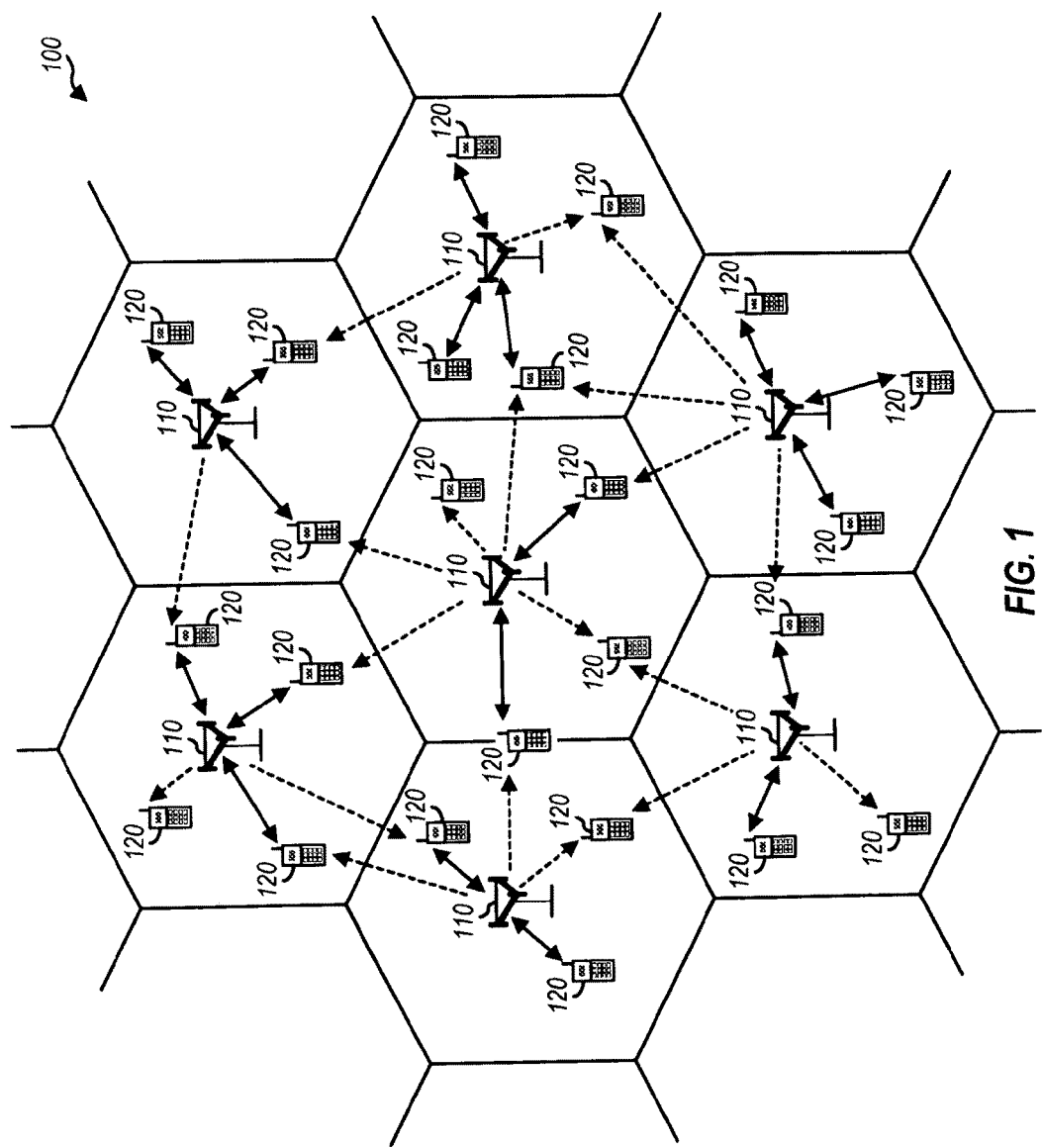
FIG. 1 shows a wireless communication system.

FIG. 1 shows a wireless communication system 100 with multiple Node Bs 110. A Node B may be a fixed station used for communicating with the UEs and may also be referred to as an evolved Node B (eNB), a base station, an access point, etc. Each Node B 110 provides communication coverage for a particular geographic area. The overall coverage area of each Node B 100 may be partitioned into multiple (e.g., three) smaller areas. In 3GPP, the term "cell" can refer to the smallest coverage area of a Node B and/or a Node B subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates communication between a Node B and a UE. A broken line with a single arrow indicates a UE receiving a downlink signal from a Node B. A UE may perform cell search based on the downlink signals transmitted by the Node Bs.

In system 100, Node Bs 110 may periodically transmit synchronization signals to allow UEs 120 to detect for the Node Bs and to obtain information such as timing, frequency offset, cell ID, etc. The synchronization signals may be generated and transmitted in various manners. In one design that is described in detail below, each Node B periodically transmits a PSC signal and an SSC signal. The PSC signal may be generated based on a PSC sequence and sent on a primary synchronization channel (P-SCH). The SSC signal may be generated based on an SSC sequence and sent on a secondary synchronization channel (S-SCH). PSC and SSC may also be referred to by other names such as primary and secondary synchronization sequences.

Figure 2:
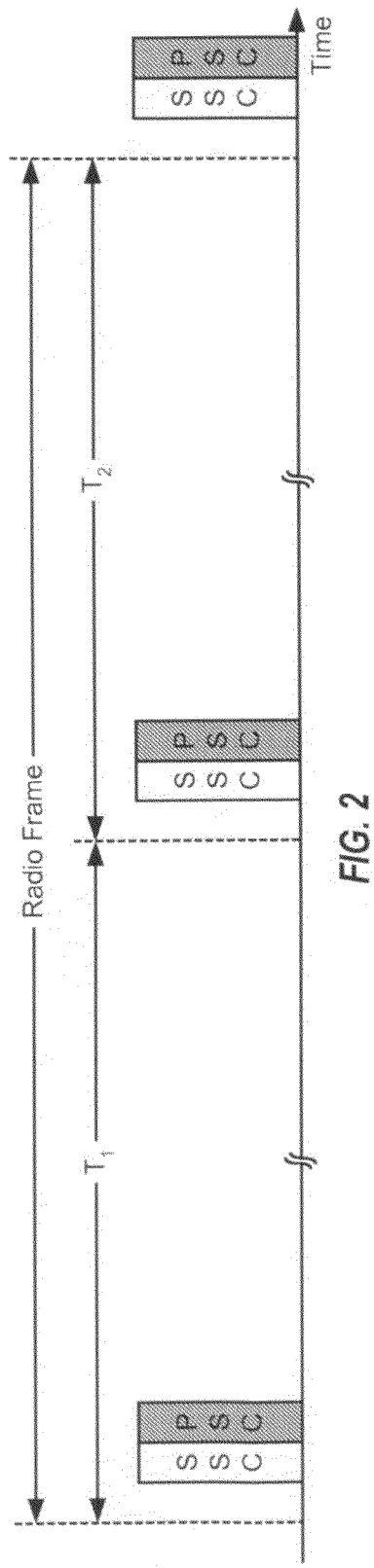
FIG. 2 shows example transmission of PSC and SSC.

FIG. 2 shows example transmission of the PSC and SSC in accordance with one design. The transmission timeline for the downlink may be partitioned into units of radio frames. Each radio frame may have a predetermined duration, e.g., 10 milliseconds (ms). In the design shown in FIG. 2, the PSC is sent near the start and middle of the radio frame, and the SSC is sent just before the PSC. In general, the PSC may be sent at any rate, e.g., any number of times in each radio frame. The SSC may also be sent at any rate, which may be the same as or different from the rate of the PSC. The SSC may be sent near the PSC (e.g., either immediately before or after the PSC) so that a channel estimate derived from the PSC may be used for coherent detection of the SSC, as described below.

In one design, all cells may transmit the same PSC sequence to allow the UEs to detect for these cells. Different cells may transmit different SSC sequences to allow the UEs to identify these cells and to possibly obtain additional information from the cells. The number of SSC sequences may be dependent on the number of supported cell identifiers (IDs) and/or other information to send in the SSC.

A UE may perform cell search (e.g., at power up) using a two-stage detection process. In one design, the two-stage detection process may include:

1. PSC detection stage—
    a. Detect for cells based on the PSC transmitted by the cells,
    b. Obtain symbol timing and possibly frame timing for each detected cell, and
    c. Estimate frequency offset and channel response for each detected cell; and
2. SSC detection stage—
    a. Identify each detected cell based on the SSC transmitted by the cell, and
    b. Obtain frame timing if not provided by the PSC detection stage.

The UE may also obtain other information (e.g., cyclic prefix information, transmit antenna information, etc.) based on the PSC and SSC.

Cell search may be relatively complex and may consume much battery power for a handheld device. For the PSC detection stage, the symbol/frame timing may be unknown, so the UE may correlate a received signal with a locally generated PSC sequence at different timing hypotheses (or time offsets) in order to detect for the PSC sequence transmitted by a cell. For the SSC detection stage, the symbol/frame timing may be known from the PSC detection stage, but there may be many SSC hypotheses (e.g., cell IDs) to test. The UE may correlate the received signal with different candidate SSC sequences in order to detect for the SSC sequence transmitted by the cell. The PSC and SSC sequences may be designed to reduce the complexity of the PSC and SSC detection by the UE.

Low complexity and high detection performance are desirable for both the PSC and SSC. To improve SSC detection performance, the UE may perform coherent detection of the SSC for each detected cell based on a channel estimate obtained from the PSC for that cell. The PSC may thus be designed to have good auto-correlation properties, to provide good frequency offset and channel estimation capabilities, and to have low detection complexity.

A CAZAC sequence may be used for the PSC. Some example CAZAC sequences include a Frank sequence, a Chu sequence, a generalized chirp-like (GCL) sequence, etc. A CAZAC sequence can provide zero auto-correlation, which is a large value for the correlation of the CAZAC sequence with itself at zero offset and zero values for all other offsets. The zero auto-correlation property is beneficial for accurately estimating the channel response and reducing timing search time. However, the GCL and Chu sequences have ambiguity between time offset and frequency offset, which means that a timing error at a receiver causes a corresponding phase ramp in the time domain or an equivalent frequency offset in the frequency domain. Thus, frequency offset estimation performance may be degraded since it would not be known whether a detected frequency offset at the receiver is due to a frequency error or a timing error at the receiver. The Frank sequence has degraded partial correlation performance. Partial correlation refers to correlation of a received signal with a portion of a sequence instead of the entire sequence. Partial correlation may provide improved detection performance over full correlation (which is correlation across the entire sequence) when a large frequency offset is present at the receiver. Partial correlation may be performed over a suitable time duration, which may be determined based on the maximum expected frequency offset at the receiver. However, the auto-correlation peak for the Frank sequence may be wide for partial correlation. For good performance, the PSC should provide good channel estimation capability with no potential problem in estimating frequency offset and no problem with partial correlation.

In an aspect, a PSC sequence may be generated based on the Frank sequence and a constant amplitude sequence that is repeated multiple times. The Frank sequence can provide good frequency offset and channel estimation performance. The constant amplitude sequence can provide good partial correlation performance.

The Frank sequence f (n) may be expressed as:

$$f(n) = e^{j\frac{2\pi p(n \operatorname{div} N)(n \operatorname{mod} N)}{N}}, \text{ for } n = 0, \ldots, N^2 - 1, \qquad \text{Eq (1)}$$

where N and p may be any positive integer values relatively prime of each other, and $N^2$ is the length of the Frank sequence.

In equation (1), p is a sequence index for the Frank sequence. Different Frank sequences may be generated with different values of p.

The constant amplitude sequence may be any sequence having a constant amplitude and good auto-correlation properties. For example, the constant amplitude sequence may be based on a Golay sequence, a Golay complementary sequence, a maximum-length (M) sequence, a PN sequence, etc. Golay sequences and Golay complementary sequences of different lengths may be generated in a manner known in the art. An M-sequence is a PN sequence of maximum length $2^L - 1$ and is generated based on a primitive polynomial, where L may be any integer value. A constant amplitude sequence of length $2^L$ may be obtained from an M-sequence of length $2_L - 1$ by adding either +1 or −1 to the M-sequence so that the number of +1 is equal to the number of −1. In general, the length of the constant amplitude sequence may be any integer divisor of $N^2$, so that the length of the Frank sequence is integer multiple times the length of the constant amplitude sequence.

In one design, a constant amplitude sequence of length N is repeated N times to obtain a repeated constant amplitude sequence of length $N^2$, as follows:

$$c(n) = [c_0(n) c_1(n) \ldots c_{N-1}(n)], \qquad \text{Eq (2)}$$

where $c_i(n)$ is the i-th copy of the constant amplitude sequence, for i=0, . . . , N−1, with $c_0(n) = c_1(n) = \ldots = c_i(n) = \ldots = c_{N-1}(n)$, and c(n) is the repeated constant amplitude sequence of length $N^2$.

The PSC sequence may then be generated as follows:

$$p(n) = f(n) \cdot c(n), \text{ for } n = 0, \ldots, N^2 - 1, \qquad \text{Eq (3)}$$

where p(n) is the PSC sequence of length $N^2$.

In one example design, a PSC sequence of length 64 may be generated by multiplying a Frank sequence of length 64 with a repeated constant amplitude sequence of length 64. The repeated constant amplitude sequence may be obtained by repeating an 8-long Golay complementary sequence {1, 1, 1, −1, 1, 1, −1, 1} eight times.

The product of the $N^2$-long Frank sequence and the $N^2$-long repeated constant amplitude sequence (e.g., generated by N repetitions of an N-long constant amplitude sequence with good auto-correlation property) may improve partial correlation and energy combining performance. The repeated constant amplitude sequence may suppress multipath interference, which may contribute to improvement in partial correlation performance. After timing and frequency offset correction, an accurate channel estimate (due to the CAZAC property of the Frank sequence) may be obtained by removing the PSC sequence, as described below.

In another aspect, a set of PSC sequences may be generated based on complementary sequences having good aperiodic correlation properties and efficient implementations. A pair of complementary sequences A and B may be expressed as:

$$A = [a_0 a_1 \ldots a_{N-1}], \text{ and}$$

$$B = [b_0 b_1 \ldots b_{N-1}], \qquad \text{Eq (4)}$$

where $a_n$ and $b_n$ are the n-th element of complementary sequences A and B, respectively.

An aperiodic auto-correlation function $R_A(k)$ for sequence A and an aperiodic auto-correlation function $R_B(k)$ for sequence B may be expressed as:

$$R_A(k) = \sum_{n=0}^{N-k-1} a_n \cdot a_{n-k} \text{ and } R_B(k) = \sum_{n=0}^{N-k-1} b_n \cdot b_{n+k}, \qquad \text{Eq (5)}$$

$$k = 0, \ldots, N-1.$$

For complementary sequences A and B, the sum of their aperiodic correlation functions is zero for all positions except at zero delay, as follows:

$$R(k) = R_A(k) + R_B(k) = \begin{cases} 2N & \text{for } k = 0 \\ 0 & \text{for } k = 1, \ldots, N-1. \end{cases} \qquad \text{Eq (6)}$$

PSC sequences may be generated based on various types of complementary sequences such as Golay complementary sequences (GCS), hierarchical Golay complementary sequences, etc. Golay complementary sequences have good aperiodic correlation properties as shown in equations (5) and (6). Furthermore, for binary Golay complementary sequences of length N, a GCS correlator may be efficiently implemented using only 2 log, (N) complex additions, as described below.

Golay complementary sequences of different lengths may be generated in various manners. A direct construction method for generating different pairs of Golay complementary sequences of any length N is described by Marcel J.E. Golay in a paper entitled "Complementary Series," IRE Trans. Inform. Theory, IT-7:82-87, 1961. N different pairs of Golay complementary sequences of length N may also be obtained by multiplying a pair of Golay complementary sequences of length N with an N×N Hadamard matrix.

PSC sequences may be generated based on complementary sequences A and B in various manners. In one design, a pair of PSC sequences $PSC_1$ and $PSC_2$ of length 2N may be generated as follows:

$$PSC_1 = A + B, \text{ and}$$

$$PSC_2 = B + A. \qquad \text{Eq (7)}$$

In the design shown in equation (7), $PSC_1$ is generated by concatenating complementary sequence A with complementary sequence B, and $PSC_2$ is generated by concatenating complementary sequence B with complementary sequence A. For example, PSC sequences of length 64 may be generated by concatenating complementary sequences A and B of length 32.

In another design, a pair of PSC sequences of length N may be generated as follows:

$$PSC_1 = A, \text{ and}$$

$$PSC_2 = B. \qquad \text{Eq (8)}$$

In the design shown in equation (8), PSC sequences of length 64 may be generated based on complementary sequences A and B of length 64. The use of longer complementary sequences A and B for the PSC may reduce detection complexity. The longer 64-length complementary sequences may also have lower side lobe level than the 32-length complementary sequences used for the design shown in equation (7).

Other PSC sequences may also be generated, e.g., $PSC_1 = A + A$ and $PSC_2 = B + B$. In any case, for PSC sequences generated based on Golay complementary sequences A and B, a GCS correlator may be efficiently implemented by exploiting the properties of the Golay complementary sequences.

Figure 3:
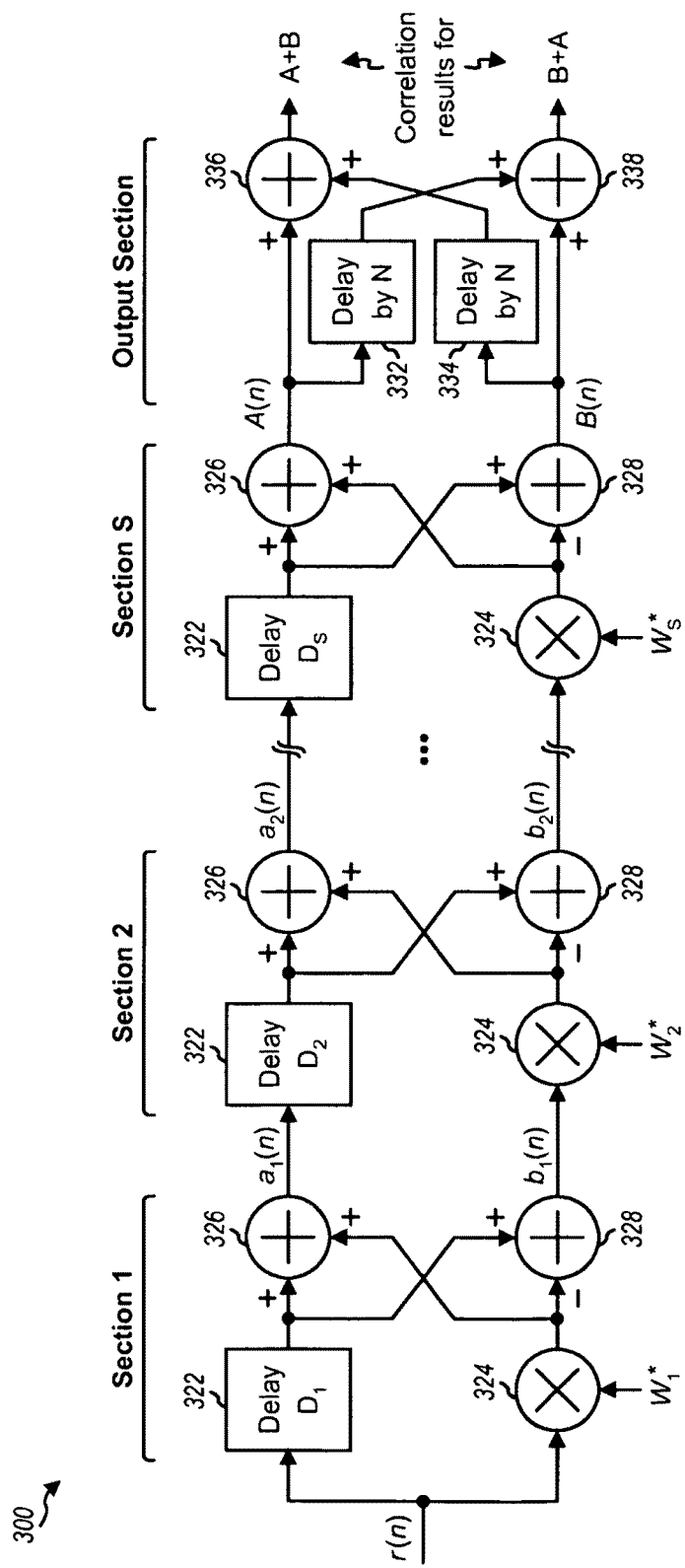
FIG. 3 shows a Golay complementary sequence (GCS) correlator.

FIG. 3 shows a design of a GCS correlator 300 that may be used to perform sliding correlation for Golay complementary sequences A and B. GCS correlator 300 includes S sections, where $S = \log_2(N)$ and N is the length of the Golay complementary sequences. For example, S=5 sections may be used for correlation of Golay complementary sequences of length N=32.

The first section receives input samples r(n). Each subsequent section s, for s=2, . . . , S, receives partial correlation results $a_{s-1}(n)$ and $b_{s-1}(n)$ from the prior section and provides partial correlation results $a_s(n)$ and $b_s(n)$ to the next section. The last section S provides correlation results A(n) and B(n) for Golay complementary sequences A and B, respectively.

Each section includes a delay unit 322, a multiplier 324, and summers 326 and 328. For section s, delay unit 322 receives $a_{s-1}(n)$ from prior section s-1 and provides a delay of $D_s$ samples. Multiplier 324 receives $b_{s-1}(n)$ from prior section s-1 and multiplies $b_{s-1}(n)$ with weight $W_s$. Summer 326 sums the outputs of delay unit 322 and multiplier 324 and provides $a_s(n)$ to the next section. Summer 328 subtracts the output of multiplier 324 from the output of delay unit 322 and provides b (n) to the next section.

After an initial delay of N-1, chips the last section S provides one pair of correlation results A(n) and B(n) for each input sample r(n). Summer 326 in the last section S provides the correlation result A(n) for the correlation of the N most recent input samples with Golay complementary sequence A. Summer 328 in the last section S provides the correlation result B(n) for the correlation of the N most recent input samples with Golay complementary sequence B.

Delays $D_1$ through $D_S$ and weights $W_1$ through $W_S$ for the S sections may be determined based on the specific Golay complementary sequences A and B selected for use. In one design, delays $D_1$ through $D_S$ for the S sections may be such that $D_1 = N/2$ for the first section and $D_s = D_{s-1}/2$ for each subsequent section. Weights $W_1$ through $W_S$ for the S sections may be such that $W_s \in \{+1, -1\}$ for binary Golay complementary sequences. Different delays $D_1$ through $D_S$ and/or different weights $W_1$ through $W_S$ may be used for different pairs of Golay complementary sequences A and B.

An output section includes delay units 332 and 334 and summers 336 and 338. Delay units 332 and 334 delay correlation results A(n) and B(n), respectively, by N sample periods. Summer 336 sums the correlation result A(n) from summer 326 with a delayed correlation result B(n-N) from delay unit 334 and provides a final correlation result for $PSC_1 = A + B$. Summer 338 sums the correlation result B(n) from summer 328 with a delayed correlation result A(n-N) from delay unit 332 and provides a final correlation result for $PSC_2 = B + A$.

For the design shown in equation (7), GCS correlator 300 can perform correlation for each half of the PSC to obtain partial correlation results A(n) and B(n) for that PSC half. Since weights $W_1$ through $W_S$ are +1 or -1, the correlation complexity is determined by the number of complex additions/subtractions. For each half of the PSC with N=32, GCS correlator 300 can perform correlation for both complementary sequences A and B with only $2 \log_2(32) = 10$ complex additions. Two partial correlation results A(n) and B(n) may be obtained for the later half of the PSC for a given timing hypothesis n. Two partial correlation results A(n-N) and B(n-N) may be obtained for the earlier half of the PSC for the same timing hypothesis in prior sample period n-N and stored in delay units 332 and 334. One more addition may then be performed by summer 336 to combine the two partial correlation results A(n) and B(n-N) to obtain the final correlation result for $PSC_1 = A + B$. One more addition may be performed by summer 338 to combine the two partial correlation results B(n) and A(n-N) to obtain the final correlation result for $PSC_2 = B + A$.

For the design shown in equation (7), partial correlation may be performed for each half of the PSC in order to combat large frequency offset at the receiver. The complexity for coarse timing acquisition may be reduced using the results of the partial correlation. For each timing hypothesis, the partial correlation results are for sequences A+0 and 0+B and may be used to eliminate many candidates. For example, if the partial correlation results are below a threshold, then the full correlation for sequences A+B and A+B may be skipped. The same detection techniques may also be used for the design of A+A and B+B.

The partial correlation results for each half of the PSC are complex values and may be used to estimate frequency offset. A phase offset $\theta(n)$ may be estimated based on the partial correlation results, as follows:

$$\theta(n) = \angle[A^*(n) \cdot B(n-N)], \text{ or} \qquad \text{Eq (9a)}$$

$$\theta(n) = \angle[B^*(n) \cdot A(n-N)], \qquad \text{Eq (9b)}$$

where "*" denotes a complex conjugate. Equation (9a) may be used if A+B is detected, and equation (9b) may be used if B+A is detected.

A frequency offset estimate may be derived based on the phase offset estimate, as follows:

$$f_{offset}(n) = \frac{\theta(n)}{T_{GCS}}, \qquad \text{Eq (10)}$$

where $T_{GCS}$ is the duration of the Golay complementary sequences, in units of seconds.

The detection complexity of PSC sequences A+B and B+A are essentially the same. One information bit may be conveyed by transmitting either A+B or B+A. For example, A+B may be transmitted to convey a bit value of '1', and B+A may be transmitted to convey a bit value of '0'. The information bit may indicate one of two possible cyclic prefix lengths or may convey other information. With two more additions, both hypotheses A+B and B+A may be tested, and the information bit may be recovered from the winning hypothesis. If the PSC is transmitted multiple times in a radio frame, then more than one information bit may be conveyed by transmitting different combinations of PSC sequences in one radio frame.

For the design of PSC sequences A and B shown in equation (8), one information bit may be conveyed by transmitting either A or B. For example, the PSC may be transmitted twice in one radio frame, A followed by B may be transmitted to convey a bit value of '1', and B followed by A may be transmitted to convey a bit value of '0'. One information bit may also be embedded for the design with PSC=C+A and the PSC transmitted once or twice in one frame.

It can be shown that $N \cdot \log_2(N)!$ different pairs of Golay complementary sequences of length N may be generated for a given N. If one pair of Golay complementary sequences is used for all cells, then this GCS pair may be selected to have (i) low side lobe level in aperiodic auto-correlations, or low $R_A(k)$ and $R_B(k)$ for $k=1, \ldots, N-1$, (ii) low cross-correlation between the two Golay complementary sequences, and (iii) low variation in frequency response in order to provide good channel estimate performance.

Multiple pairs of Golay complementary sequences may also be used to generate more PSC sequences. For example, two pairs of Golay complementary sequences $(A_1, B_1)$ and $(A_2, B_2)$ may be used to generate four PSC sequences $PSC_1$ through $PSC_4$, as follows:

$$PSC_1 = A_1 + B_1,$$

$$PSC_2 = A_2 + B_2,$$

$$PSC_3 = B_1 + A_1, \text{ and}$$

$$PSC_4 = B_2 + A_2. \quad \text{Eq (11)}$$

With four PSC sequences, the cells in the system may be partitioned into four groups 1 through 4, with each cell belonging in only one group. Groups 1 through 4 may be associated with $PSC_1$ through $PSC_4$, respectively. The cells in each group may use the PSC sequence for that group. Detection complexity may be reduced by reusing partial correlation results to derive final correlation results for different PSCs. For example, the partial correlation result $A_1(n)$ for Golay complementary sequence $A_1$ for the later half of $PSC_1$ may be reused as the partial correlation result $A_1 (n-N)$ for Golay complementary sequence $A_1$ for the earlier half of $PSC_3$.

In general, the cells may be partitioned into any number of groups, and a sufficient number of PSC sequences may be generated for these groups. Partitioning the cells into multiple groups may allow a UE to derive a more accurate channel estimate since a channel estimate derived for a given PSC would observe interference from only cells using that PSC (instead of all cells if only one PSC is used by all cells).

PSC sequences generated based on Golay complementary sequences may have much lower detection complexity than PSC sequences generated based on PN sequences or complex sequences. For each timing hypothesis, a full correlation for a 64-length PSC sequence may be performed with (i) 12 complex additions for Golay complementary sequences (ii) 63 complex additions for a PN sequence, or (iii) 64 complex multiplications and 63 complex additions for a complex sequence.

For all of PSC sequences described above, multiple PSC sequences may be transmitted in one radio frame and may be non-uniformly placed in the radio frame. For example, one PSC sequence may be transmitted at or near the start of a 10-ms radio frame, and another PSC sequence may be transmitted approximately 4.5 ms from the start of the radio frame. In this case, a UE may perform parallel pattern searching and may search all possible combinations of non-uniformly spaced patterns and choose the best candidate for each hypothesis.

The SSC may be used to convey cell ID and/or other information. A large set of SSC sequences may be defined, and neighboring cells may be assigned different SSC sequences that may be used to distinguish these cells. For example, a large set of orthogonal or pseudo-orthogonal sequences may be used for the SSC sequences. These orthogonal or pseudo-orthogonal sequences may be generated based on the Chu or GCL sequence with different sequence indices, frequency-domain PN sequences, etc. Different time shifts may also be used to generate many pseudo-orthogonal sequences. The set of orthogonal or pseudo-orthogonal sequences should be selected based on correlation property and complexity. In any case, regardless of the particular type of orthogonal or pseudo-orthogonal sequences selected for use, detection complexity may be high for a large set size since complexity is proportional to the number of sequences in the set. Detection complexity may be reduced by using a small set size, but this may not provide a sufficient number of cell IDs.

In yet another aspect, phase-modulated sequences may be used to obtain a larger set size and/or to reduce detection complexity for the SSC. A set of base sequences may be generated based on a CAZAC sequence with different sequence indices, different PN sequences, different complementary sequences, etc. The CAZAC sequence may be the Chu sequence, the Frank sequence, the GCL sequence, etc. Each base sequence may be modulated with different possible modulation symbols from a selected modulation scheme to obtain different possible SSC sequences. If binary phase shift keying (BPSK) is used, then each base sequence may be modulated with two possible BPSK symbols (e.g., +1 and −1) to obtain two SSC sequences. If quadrature phase shift keying (QPSK) is used, then each base sequence may be modulated with four possible QPSK symbols (e.g., 1+j, −1+j, 1−j and −1−j) to obtain four SSC sequences. The number of SSC sequences may thus be increased by M, where M is the number of modulation symbols for the selected modulation scheme.

For the SSC detection stage, the UE may first correlate the received signal with different possible base sequences. The detection complexity may be reduced by 1/M since the number of base sequences is 1/M times the number of SSC sequences. Alternatively, a larger set of SSC sequences may be supported for a given detection complexity. In any case, after detecting a particular base sequence from the correlation with different possible base sequences, coherent detection may be performed for the detected base sequence with the channel estimate derived from the PSC to determine which one of the M possible SSC sequences was sent. This coherent detection or modulated-phase identification may be performed with minimal additional operations.

A set of Q phase-modulated SSC sequences may have similar performance as a set of Q orthogonal or pseudo-orthogonal sequences. However, the detection complexity may be reduced by 1/M (e.g., ¼ for QPSK or ½ for BPSK), or M times more hypotheses may be resolved. Higher order modulation (e.g., 8-PSK, 16-QAM, etc.) may also be used to further reduce detection complexity or further increase the number of SSC sequences.

Figure 4:
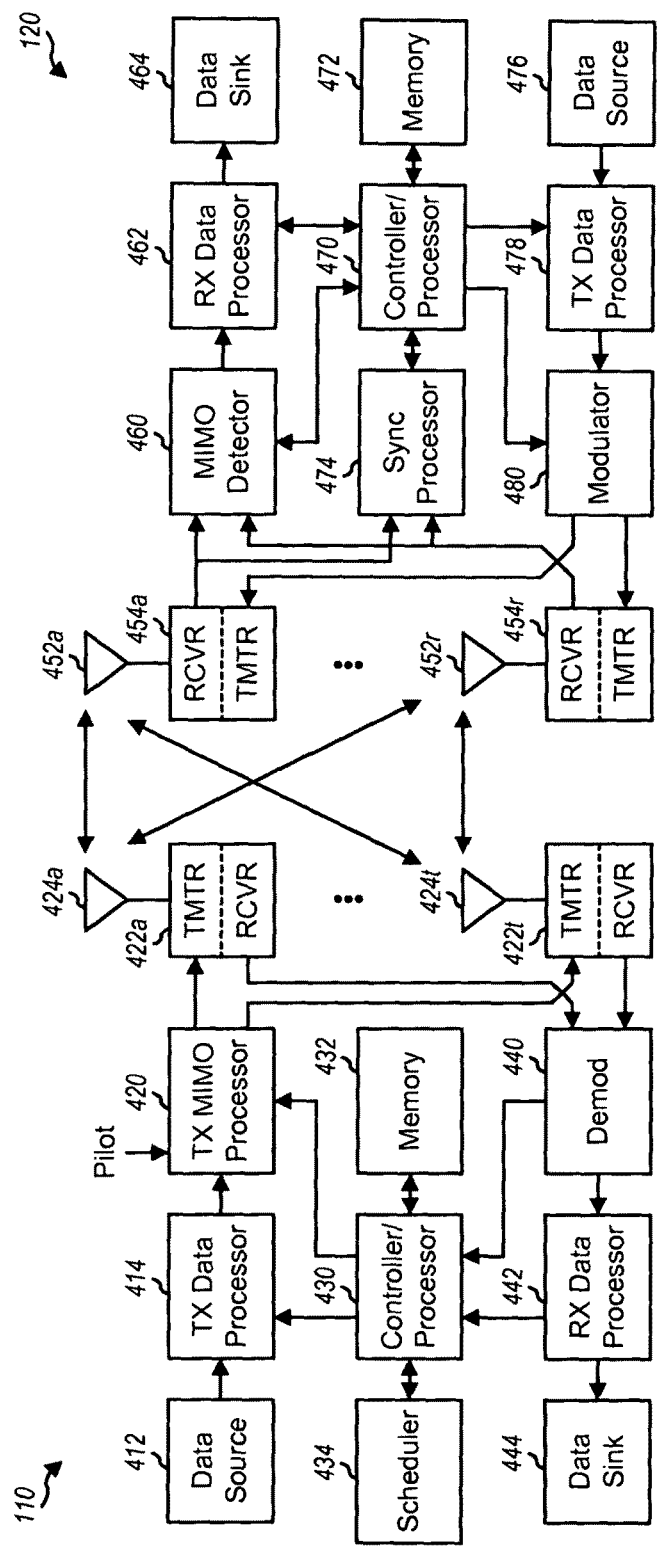
FIG. 4 shows a block diagram of a Node B and a UE.

FIG. 4 shows a block diagram of a design of a Node B 110 and a UE 120, which are one of the Node Bs and one of the UEs in FIG. 1. In this design, Node B 110 is equipped with T antennas 424*a* through 424*t*, and UE 120 is equipped with R antennas 452*a* through 452*r*, where in general $T \geq 1$ and $R \geq 1$.

At Node B 110, a transmit (TX) data processor 414 may receive traffic data for one or more UEs from a data source 412. TX data processor 414 may process (e.g., format, encode, and interleave) the traffic data for each UE based on one or more coding schemes selected for that UE to obtain coded data. TX data processor 414 may then modulate (or symbol map) the coded data for each UE based on one or more modulation schemes (e.g., BPSK, QSPK, PSK or QAM) selected for that UE to obtain modulation symbols.

A TX MIMO processor 420 may multiplex the modulation symbols for all UEs with pilot symbols using any multiplexing scheme. Pilot is typically known data that is processed in a known manner and may be used by a receiver for channel estimation and other purposes. TX MIMO processor 420 may process (e.g., precode) the multiplexed modulation symbols and pilot symbols and provide T output symbol streams to T transmitters (TMTR) 422a through 422t. In certain designs, TX MIMO processor 420 may apply beamforming weights to the modulation symbols to spatially steer these symbols. Each transmitter 422 may process a respective output symbol stream, e.g., for orthogonal frequency division multiplexing (OFDM), to obtain an output chip stream. Each transmitter 422 may further process (e.g., convert to analog, amplify, filter, and upconvert) the output chip stream to obtain a downlink signal. T downlink signals from transmitters 422a through 422t may be transmitted via T antennas 424a through 424t, respectively.

At UE 120, antennas 452a through 452r may receive the downlink signals from Node B 110 and provide received signals to receivers (RCVR) 454a through 454r, respectively. Each receiver 454 may condition (e.g., filter, amplify, downconvert, and digitize) a respective received signal to obtain input samples and may further process the input samples (e.g., for OFDM) to obtain received symbols. A MIMO detector 460 may receive and process the received symbols from all R receivers 454a through 454r based on a MIMO receiver processing technique to obtain detected symbols, which are estimates of the modulation symbols transmitted by Node B 110. A receive (RX) data processor 462 may then process (e.g., demodulate, deinterleave, and decode) the detected symbols and provide decoded data for UE 120 to a data sink 464. In general, the processing by MIMO detector 460 and RX data processor 462 is complementary to the processing by TX MIMO processor 420 and TX data processor 414 at Node B 110.

On the uplink, at UE 120, traffic data from a data source 476 and signaling may be processed by a TX data processor 478, further processed by a modulator 480, conditioned by transmitters 454a through 454r, and transmitted to Node B 110. At Node B 110, the uplink signals from UE 120 may be received by antennas 424, conditioned by receivers 422, demodulated by a demodulator 440, and processed by an RX data processor 442 to obtain the traffic data and signaling transmitted by UE 120.

Controllers/processors 430 and 470 may direct the operation at Node B 110 and UE 120, respectively. Memories 432 and 472 may store data and program codes for Node B 110 and UE 120, respectively. A synchronization (Sync) processor 474 may perform cell search based on the input samples and provide detected Node Bs and their timing. A scheduler 434 may schedule UEs for downlink and/or uplink transmission and may provide assignments of resources for the scheduled UEs.

Figure 5:
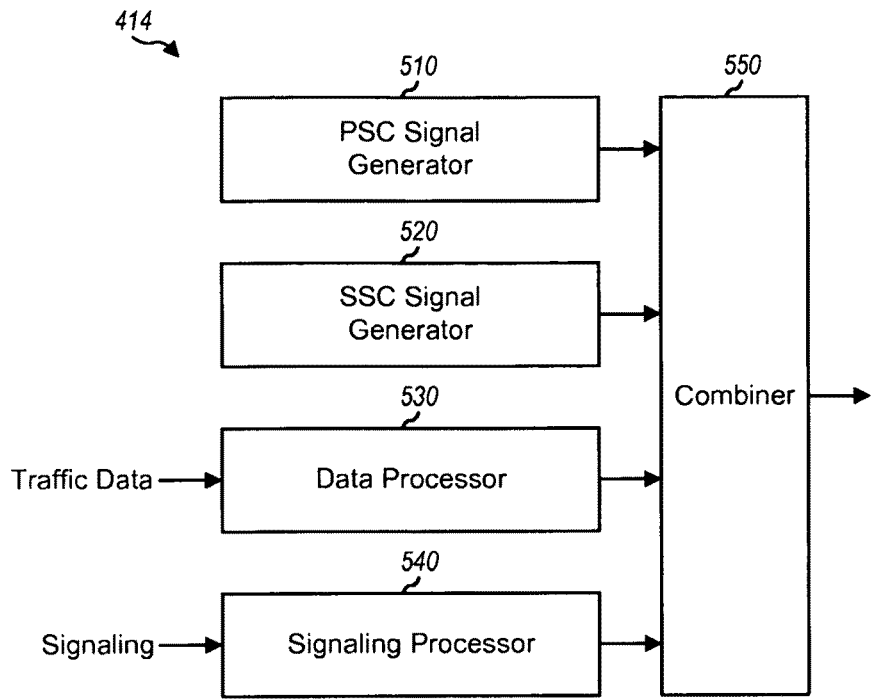
FIG. 5 shows a block diagram of a transmit (TX) data processor at the Node B.

FIG. 5 shows a block diagram of a design of TX data processor 414 at Node B 110. Within TX data processor 414, a generator 510 generates a PSC signal based on one of the techniques described herein. A generator 520 generates an SSC signal as described below. A data processor 530 processes traffic data and provides modulation symbols for data. A signaling processor 540 processes signaling and provides modulation symbols for signaling. A combiner 550 receives and combines the outputs of generators 510 and 520 and processors 530 and 540 using code division multiplexing (CDM), time division multiplexing (TDM), frequency division multiplexing (FDM), OFDM, and/or some other multiplexing scheme. For example, the PSC and SSC signals may each be sent on a designated set of subcarriers in a designated symbol period.

Figure 6A:
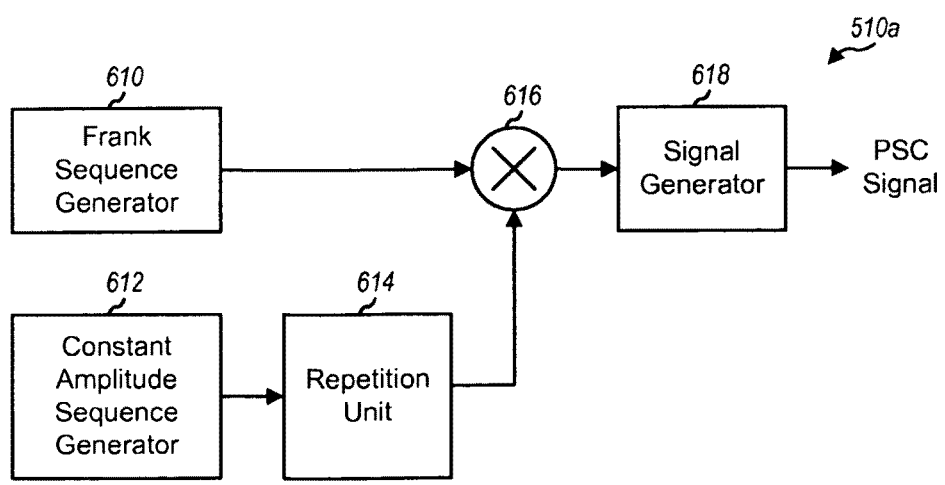
FIGS. 6A and 6B show block diagrams of two PSC signal generators.

FIG. 6A shows a block diagram of a PSC signal generator 510a, which is one design of PSC signal generator 510 in FIG. 5. Within PSC signal generator 510a, a generator 610 generates a Frank sequence of length $N^2$, e.g., as shown in equation (1). A generator 612 generates a constant amplitude sequence, which may be a Golay segment, a PN sequence, etc. A repetition unit 614 repeats the constant amplitude sequence multiple times and provides a repeated constant amplitude sequence of length $N^2$. A multiplier 616 multiplies the Frank sequence with the repeated constant amplitude sequence, element by element, and provides a PSC sequence.

A signal generator 618 generates a PSC signal based on the PSC sequence. In one design, for time-domain processing, generator 618 may interpolate the PSC sequence of length $N^2$ to obtain a time-domain PSC signal of length K, which may be sent in K chip periods. In one design, for frequency-domain processing, generator 618 may map the $N^2$ samples of the PSC sequence to $N^2$ consecutive (or evenly spaced) subcarriers, map zero values to remaining subcarriers, and perform an inverse discrete Fourier transform (IDFT) on the mapped values to obtain a time-domain PSC signal of length K. For both time-domain and frequency-domain processing, signal generator 618 may append a cyclic prefix of length L, where L may be selected based on the expected delay spread in the system. L may be a fixed value or a configurable value. Signal generator 618 may also generate the PSC signal in other manners.

Figure 6B:
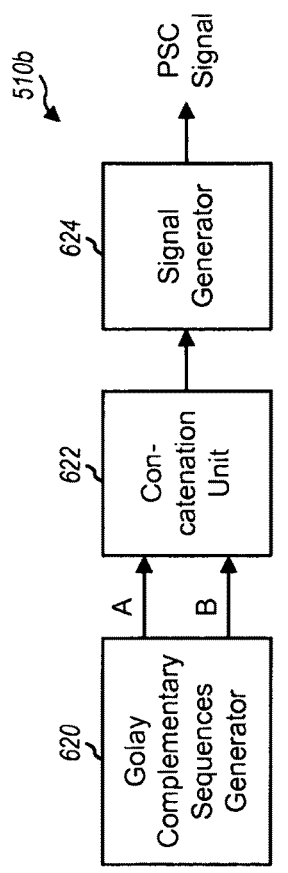

FIG. 6B shows a block diagram of a PSC signal generator 510b, which is another design of PSC signal generator 510 in FIG. 5. Within PSC signal generator 510b, a generator 620 generates Golay complementary sequences A and B of length N. A unit 622 may concatenate the complementary sequences A and B as A+B, B+A, A+A, or B+B. Alternatively, unit 622 may simply provide one of the complementary sequences A and B. A signal generator 624 generates a PSC signal based on the PSC sequence, as described above for FIG. 6A.

Figure 6C:
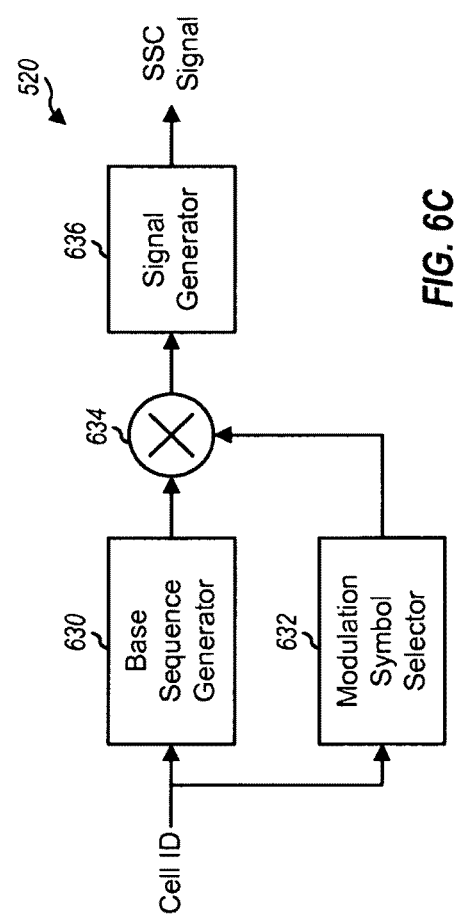
FIG. 6C shows a block diagram of an SSC signal generator.

FIG. 6C shows a block diagram of a design of SSC signal generator 520 in FIG. 5. A cell ID and/or other information may be provided to a generator 630 and a selector 632. Generator 630 may select or generate a base sequence based on the received information, and selector 632 may select a modulation symbol based on the received information. The base sequence may be a CAZAC sequence, a PN sequence, a Golay sequence, etc., and may be selected from a set of base sequences available for use. A multiplier 634 multiplies each element of the base sequence with the complex value for the selected modulation symbol and provides an SSC sequence. A signal generator 636 generates an SSC signal based on the SSC sequence, e.g., using time-domain processing or frequency-domain processing described above for FIG. 6A.

Figure 7:
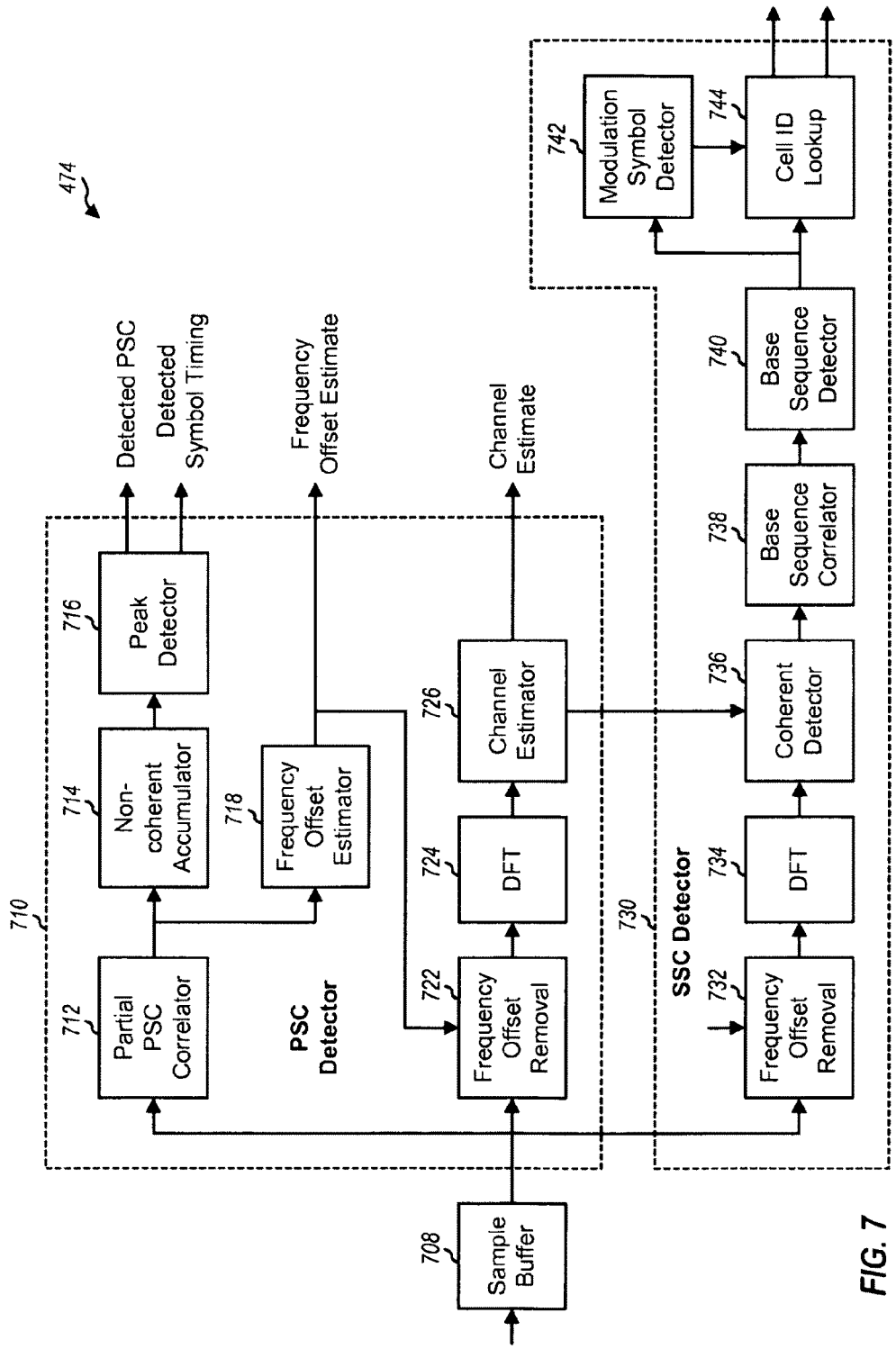
FIG. 7 shows a block diagram of a sync processor at the UE.

FIG. 7 shows a block diagram of a design of sync processor 474 at UE 120 in FIG. 4. Sync processor 474 includes a PSC detector 710 and an SSC detector 730. PSC detector 710 may detect for each of the possible PSC sequences in each timing hypothesis, e.g., each sample period. For clarity, PSC detection for one PSC sequence for one timing hypothesis (e.g., the current sample period n) is described below. A sample buffer 708 receives and stores the input samples and provides appropriate input samples to PSC detector 710 and SSC detector 730.

Within PSC detector 710, a partial PSC correlator 712 performs partial correlation on the input samples with segments of the PSC sequence and provides partial correlation results for the PSC segments for the timing hypothesis being evaluated. For a PSC sequence generated based on the Frank sequence and the repeated constant amplitude sequence, the partial correlation result for one PSC segment of length N may be obtained by (i) multiplying N input samples with N elements of the PSC segment and (ii) coherently accumulating the N multiplication results. Coherent accumulation refers to accumulation of complex values whereas non-coherent accumulation refers to accumulation of magnitude or power. Partial correlation may also be performed over PSC segments of other lengths that are integer multiple of N, e.g., $N^2/2$. For a PSC sequence generated based on Golay complementary sequences, partial PSC correlator 712 may be implemented with GCS correlator 300 in FIG. 3 and may provide correlation results for the two halves of the PSC sequence for the timing hypothesis being evaluated. An accumulator 714 non-coherently accumulates the partial correlation results for all PSC segments and provides a final correlation result for the timing hypothesis. A peak detector 716 determines whether or not a PSC sequence has been detected for the timing hypothesis, e.g., by comparing the final correlation result against a threshold. If a PSC is detected, then detector 716 provides an indication of a detected PSC and its symbol timing.

If a PSC is detected, then a unit 718 may estimate frequency offset based on the partial correlation results from unit 712, e.g., as shown in equations (9) and (10). A unit 722 receives the input samples for the detected PSC and removes the estimated frequency offset from these samples. A DFT unit 724 transforms the frequency-corrected samples from unit 722 and provides frequency-domain symbols. A channel estimator 726 removes the detected PSC sequence from the frequency-domain symbols and provides channel gains for different subcarriers.

SSC detector 730 detects for the SSC whenever a PSC is detected. Within SSC detector 730, units 732 and 734 process the input samples for a potential SSC in similar manner as units 722 and 724, respectively. A coherent detector 736 performs coherent detection of the frequency-domain symbols from unit 734 with the channel gains from unit 726 and provides detected symbols. A base sequence correlator 738 correlates the detected symbols with each of the candidate base sequences (after DFT) and provides a correlation result for each base sequence. A base sequence detector 740 receives the correlation results for all candidate base sequences and determines whether or not any base sequence has been detected. If a base sequence has been detected, then a unit 742 determines which modulation symbol was sent on the base sequence. A unit 744 then determines which SSC sequence was received based on the detected base sequence and the detected modulation symbol and provides the cell ID corresponding to this SSC sequence. Unit 744 may also provide detected frame timing.

FIG. 7 shows specific designs of PSC detector 710 and SSC detector 730. PSC detection and SSC detection may also be performed in other manners. As an example, for SSC detection, unit 738 may correlate the detected symbols with each of the possible phase-modulated base sequences, and unit 742 may be omitted. The channel estimation and coherent detection may be performed in the frequency-domain (as shown in FIG. 7) or in the time domain.

FIG. 8 shows a design of a process 800 for generating a PSC signal. Process 800 may be performed by a Node B or some other transmitter. The Node B may obtain a PSC sequence generated based on a Frank sequence and a repeated constant amplitude sequence obtained by repeating a constant amplitude sequence multiple times (block 812). The constant amplitude sequence may be based on a Golay sequence, an M-sequence, a PN sequence, etc. In one design, the repeated constant amplitude sequence of length $N^2$ may be obtained by repeating N times the constant amplitude sequence of length N. The PSC sequence of length $N^2$ may be generated based on the Frank sequence of length $N^2$ and the repeated constant amplitude sequence of length $N^2$.

The Node B may generate a PSC signal based on the PSC sequence (block 814). The PSC signal may be generated by interpolating the PSC sequence and appending a cyclic prefix. Alternatively, the PSC signal may be generated by mapping elements of the PSC sequence to a set of subcarriers, mapping zero values to remaining subcarriers, transforming the mapped elements and zero values to obtain a sequence of time-domain samples, and appending a cyclic prefix to the sequence of time-domain samples.

FIG. 9 shows a design of an apparatus 900 for generating a PSC signal. Apparatus 900 includes means for obtaining a PSC sequence generated based on a Frank sequence and a repeated constant amplitude sequence obtained by repeating a constant amplitude sequence multiple times (module 912), and means for generating a PSC signal based on the PSC sequence (module 914).

FIG. 10 shows a design of a process 1000 for detecting for a PSC signal. Process 1000 may be performed by a UE or some other receiver. The UE may obtain a PSC sequence generated based on a Frank sequence and a repeated constant amplitude sequence obtained by repeating a constant amplitude sequence multiple times (block 1012). The UE may correlate a received signal with the PSC sequence to detect for cells (block 1014). For block 1014, the UE may perform partial correlation of the received signal with multiple segments of the PSC sequence, with each segment covering at least one repetition of the constant amplitude sequence. The UE may non-coherently accumulate partial correlation results for the multiple segments of the PSC sequence to obtain a full correlation result. The UE may then detect for the PSC sequence in the received signal based on the full correlation result.

The UE may obtain first and second partial correlation results for first and second parts (e.g., halves) of the PSC sequence and may estimate frequency offset based on these partial correlation results. The UE may derive a channel estimate based on the received signal and the PSC sequence (block 1016). The UE may detect for an SSC sequence in the received signal based on the channel estimate (block 1018).

FIG. 11 shows a design of an apparatus 1100 for detecting for a PSC signal. Apparatus 1100 includes means for obtaining a PSC sequence generated based on a Frank sequence and a repeated constant amplitude sequence obtained by repeating a constant amplitude sequence multiple times (module 1112), means for correlating a received signal with the PSC sequence to detect for cells (module 1114), means for deriving a channel estimate based on the received signal and the PSC sequence (module 1116), and means for detecting for an SSC sequence in the received signal based on the channel estimate (module 1118).

FIG. 12 shows a design of a process 1200 for generating a PSC signal. Process 1200 may be performed by a Node B or some other transmitter. The Node B may obtain a PSC sequence from among multiple PSC sequences generated based on at least one pair of complementary sequences, e.g., Golay complementary sequences (block 1212). The at least one pair of complementary sequences may comprise complementary sequences A and B, and the multiple PSC sequences may comprise a first PSC sequence A+B and a second PSC sequence B+A.

The Node B may generate a PSC signal based on the PSC sequence (block 1214). The Node B may generate a sequence of time-domain samples in either the time domain or frequency domain based on the PSC sequence. The Node B may then generate the PSC signal by appending a cyclic prefix to the sequence of time-domain samples.

FIG. 13 shows a design of an apparatus 1300 for generating a PSC signal. Apparatus 1300 includes means for obtaining a PSC sequence from among multiple PSC sequences generated based on at least one pair of complementary sequences (module 1312), and means for generating a PSC signal based on the PSC sequence (module 1314).

FIG. 14 shows a design of a process 1400 for detecting for a PSC signal. Process 1400 may be performed by a UE or some other receiver. The UE may obtain a PSC sequence from among multiple PSC sequences generated based on at least one pair of complementary sequences (block 1412). The UE may correlate a received signal with the PSC sequence to detect for cells (block 1414). The at least one pair of complementary sequences may comprise complementary sequences A and B, and the multiple PSC sequences may comprise a first PSC sequence A+B and a second PSC sequence B+A. The UE may obtain first and second correlation results for correlation of a first part of the received signal with complementary sequences A and B, respectively. The UE may obtain third and fourth correlation results for correlation of a second part of the received signal with complementary sequences A and B, respectively. The UE may detect for the first and second PSC sequences in the received signal based on the first, second, third and fourth correlation results.

The UE may derive a frequency offset estimate based on the first and four correlation results or the second and third correlation results. The UE may derive a channel estimate based on the received signal and the PSC sequence (block 1416). The UE may then detect for an SSC sequence in the received signal based on the channel estimate (block 1418).

FIG. 15 shows a design of an apparatus 1500 for detecting for a PSC signal. Apparatus 1500 includes means for obtaining a PSC sequence from among multiple PSC sequences generated based on at least one pair of complementary sequences (module 1512), means for correlating a received signal with the PSC sequence to detect for cells (module 1514), means for deriving a channel estimate based on the received signal and the PSC sequence (module 1516), and means for detecting for an SSC sequence in the received signal based on the channel estimate (module 1518).

Figure 16:
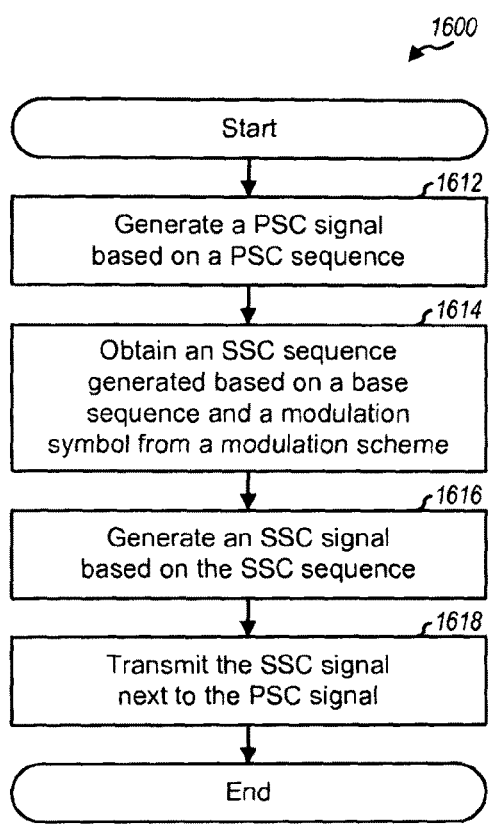

FIG. 16 shows a design of a process 1600 for generating PSC and SSC signals. Process 1600 may be performed by a Node B or some other transmitter. The Node B may generate a PSC signal based on a PSC sequence (block 1612). The Node B may obtain an SSC sequence generated based on a base sequence and a modulation symbol from a modulation scheme (block 1614). The SSC sequence may be generated by multiplying each element of the base sequence with a complex value for the modulation symbol. The base sequence and the modulation symbol may be selected based on a cell ID and/or other information.

The Node B may generate an SSC signal based on the SSC sequence, e.g., in the time domain or frequency domain as described above (block 1616). The Node B may transmit the SSC signal next to the PSC signal (block 1618).

Figure 17:
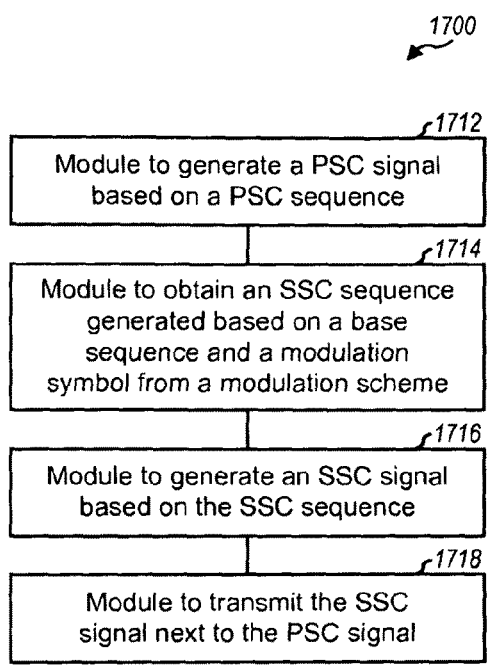

FIG. 17 shows a design of an apparatus 1700 for generating PSC and SSC signals. Apparatus 1700 includes means for generating a PSC signal based on a PSC sequence (module 1712), means for obtaining an SSC sequence generated based on a base sequence and a modulation symbol from a modulation scheme (module 1714), means for generating an SSC signal based on the SSC sequence (module 1716), and means for transmitting the SSC signal next to the PSC signal (module 1718).

Figures 18, 19:
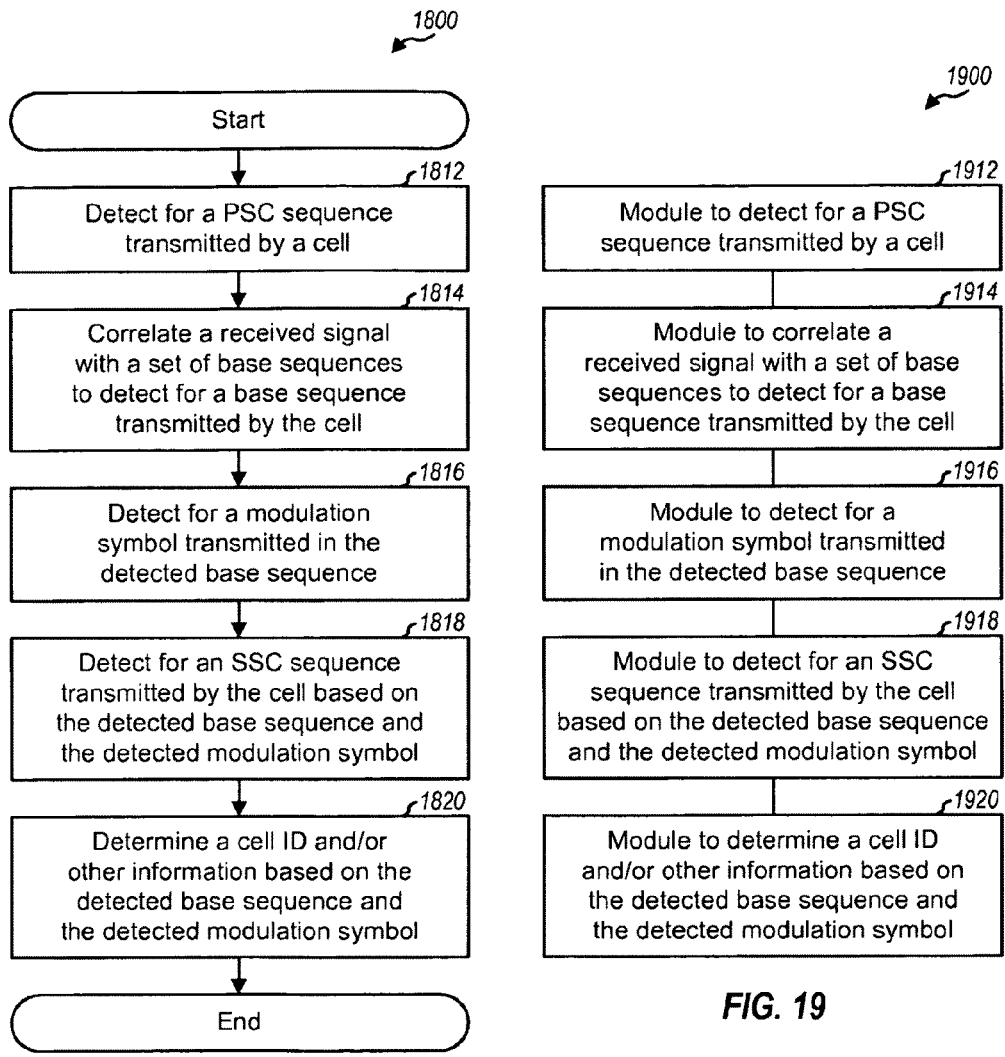

FIG. 18 shows a design of a process 1800 for detecting for PSC and SSC signals. Process 1800 may be performed by a UE or some other receiver. The UE may detect for a PSC sequence transmitted by a cell (block 1812). The UE may correlate a received signal with a set of base sequences to detect for a base sequence transmitted by the cell (block 1814). The UE may detect for a modulation symbol transmitted in the detected base sequence (block 1816). The UE may then detect for an SSC sequence transmitted by the cell based on the detected base sequence and the detected modulation symbol (block 1818).

The UE may derive a channel estimate based on the detected PSC sequence and may detect for the modulation symbol based on the channel estimate. In one design of blocks 1814 and 1816, the UE may derive channel gains for multiple subcarriers based on the detected PSC sequence, estimate frequency offset based on the detected PSC sequence, remove the estimated frequency offset from input samples to obtain frequency-corrected samples, transform the frequency-corrected samples to obtain frequency-domain symbols, perform coherent detection of the frequency-domain symbols with the channel gains to obtain detected symbols, and detect for the base sequence and the modulation symbol based on the detected symbols, as described above for FIG. 7. The UE may determine a cell ID and/or other information based on the detected base sequence and the detected modulation symbol (block 1820).

FIG. 19 shows a design of an apparatus 1900 for detecting for PSC and SSC signals. Apparatus 1900 includes means for detecting for a PSC sequence transmitted by a cell (module 1912), means for correlating a received signal with a set of base sequences to detect for a base sequence transmitted by the cell (module 1914), means for detecting for a modulation symbol transmitted in the detected base sequence (module 1916), means for detecting for an SSC sequence transmitted by the cell based on the detected base sequence and the detected modulation symbol (module 1918), and means for determining a cell ID and/or other information based on the detected base sequence and the detected modulation symbol (module 1920).

The modules in FIGS. 9, 11, 13, 15, 17 and 19 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
  at least one processor configured to:
    obtain a primary synchronization code (PSC) sequence generated based on a product of a Frank sequence and a repeated constant amplitude sequence obtained by repeating a constant amplitude sequence multiple times, and to generate a PSC signal based on the PSC sequence;
    obtain the repeated constant amplitude sequence of length $N^2$ by repeating N times the constant amplitude sequence of length N, where N is an integer value, and to generate the PSC sequence of length $N^2$ based on the Frank sequence of length $N^2$ and the repeated constant amplitude sequence of length $N^2$; and
  a memory coupled to the at least one processor.

2. The apparatus of claim 1, wherein the constant amplitude sequence is based on at least one of a Golay sequence, an M-sequence, and a pseudo-random number (PN) sequence.

3. The apparatus of claim 1, wherein the at least one processor is configured to generate the PSC signal by interpolating the PSC sequence and appending a cyclic prefix.

4. The apparatus of claim 1, wherein the at least one processor is configured to map elements of the PSC sequence to a set of subcarriers, to map zero values to subcarriers without mapped elements, to transform the mapped elements and zero values to obtain a sequence of time-domain samples, and to generate the PSC signal by appending a cyclic prefix to the sequence of time-domain samples.

5. A method for wireless communication, comprising:
  obtaining a primary synchronization code (PSC) sequence generated based on a product of a Frank sequence and a repeated constant amplitude sequence obtained by repeating a constant amplitude sequence multiple times, wherein the obtaining the PSC sequence comprises obtaining the repeated constant amplitude sequence of length $N^2$ by repeating N times the constant amplitude sequence of length N, where N is an integer value, and generating the PSC sequence of length $N^2$ based on the Frank sequence of length $N^2$ and the repeated constant amplitude sequence of length $N^2$; and
  generating a PSC signal based on the PSC sequence.

6. The method of claim 5, wherein the generating the PSC signal comprises generating a sequence of time-domain samples based on the PSC sequence, and appending a cyclic prefix to the sequence of time-domain samples to generate the PSC signal.

7. An apparatus for wireless communication, comprising:
  means for obtaining a primary synchronization code (PSC) sequence generated based on a product of a Frank sequence and a repeated constant amplitude sequence obtained by repeating a constant amplitude sequence multiple times, wherein the means for obtaining the PSC sequence comprises means for obtaining the repeated constant amplitude sequence of length $N^2$ by repeating N times the constant amplitude sequence of length N, where N is an integer value, and means for generating the PSC sequence of length $N^2$ based on the Frank sequence of length $N^2$ and the repeated constant amplitude sequence of length $N^2$; and
  means for generating a PSC signal based on the PSC sequence.

8. The apparatus of claim 7, wherein the means for generating the PSC signal comprises means for generating a sequence of time-domain samples based on the PSC sequence, and means for appending a cyclic prefix to the sequence of time-domain samples to generate the PSC signal.

9. A non-transitory machine-readable medium comprising instructions which, when executed by a machine, cause the machine to perform operations including:
obtaining a primary synchronization code (PSC) sequence generated based on a product of a Frank sequence and a repeated constant amplitude sequence obtained by repeating a constant amplitude sequence multiple times;
obtaining the repeated constant amplitude sequence of length $N^2$ by repeating N times the constant amplitude sequence of length N, where N is an integer value; and generating the PSC sequence of length $N^2$ based on the Frank sequence of length $N^2$ and the repeated constant amplitude sequence of length $N^2$; and
generating a PSC signal based on the PSC sequence.

10. The non-transitory machine-readable medium of claim 9 which, when executed by the machine, cause the machine to perform operations further including: generating a sequence of time-domain samples based on the PSC sequence; and appending a cyclic prefix to the sequence of time-domain samples to generate the PSC signal.

11. An apparatus for wireless communication, comprising:
at least one processor configured to obtain a primary synchronization code (PSC) sequence generated based on a product of a Frank sequence and a repeated constant amplitude sequence obtained by repeating a constant amplitude sequence multiple times, and to correlate a received signal with the PSC sequence to detect for cells, wherein the repeated constant amplitude sequence comprises of length $N^2$ by repeating N times the constant amplitude sequence of length N, where N is an integer value, to generate the PSC sequence of length $N^2$ based on the Frank sequence of length $N^2$ and the repeated constant amplitude sequence of length $N^2$, and to perform partial correlation of the received signal with multiple segments of the PSC sequence, each segment covering at least one repetition of the constant amplitude sequence; and
a memory coupled to the at least one processor.

12. The apparatus of claim 11, wherein the at least one processor is configured to non-coherently accumulate partial correlation results for the multiple segments of the PSC sequence to obtain a full correlation result, and to detect for the PSC sequence in the received signal based on the full correlation result.

13. The apparatus of claim 11, wherein the at least one processor is configured to obtain a first partial correlation result for a first part of the PSC sequence, to obtain a second partial correlation result for a second part of the PSC sequence, and to estimate frequency offset based on the first and second partial correlation results.

14. The apparatus of claim 11, wherein the at least one processor is configured to derive a channel estimate based on the received signal and the PSC sequence, and to detect for a secondary synchronization code (SSC) sequence in the received signal based on the channel estimate.

* * * * *